Figure 5:
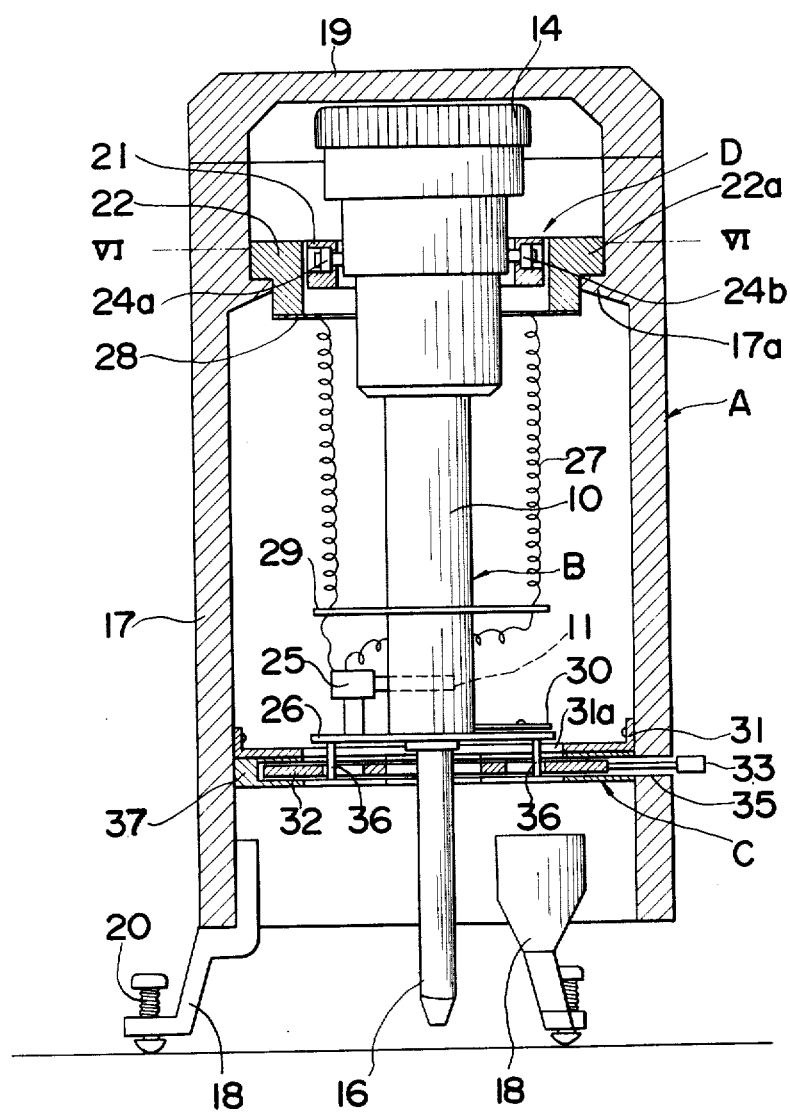

United States Patent [19]
Ohneda

[11] 3,911,588
[45] Oct. 14, 1975

[54] OPTICAL MARKER

[75] Inventor: Shoichi Ohneda, Wakayama, Japan

[73] Assignee: Minolta Camera Kabushiki Kaisha, Japan

[22] Filed: May 7, 1973

[21] Appl. No.: 357,700

[30] Foreign Application Priority Data
| | | |
|---|---|---|
| May 27, 1972 | Japan | 47-52637 |
| May 27, 1972 | Japan | 47-62270 |
| May 31, 1972 | Japan | 47-64693 |

[52] U.S. Cl. .................. 33/286; 33/189; 33/227
[51] Int. Cl. ................... G01c 15/02; G01c 15/10
[58] Field of Search ............ 33/286, 189, 366, 397, 33/275 R, 227, 402; 248/179, 180, 182

[56] References Cited
UNITED STATES PATENTS
| | | | |
|---|---|---|---|
| 2,161,718 | 6/1939 | Miller | 248/182 |
| 2,419,768 | 4/1947 | Ensign et al. | 248/179 |
| 2,821,104 | 1/1958 | Mills | 33/227 |
| 3,199,198 | 8/1965 | Arnold | 33/275 R |
| 3,354,549 | 11/1967 | Fisher | 33/397 |
| 3,505,739 | 4/1970 | Abrams | 33/189 |
| 3,533,700 | 10/1970 | Alexander | 33/286 |
| 3,588,014 | 6/1971 | Reed | 33/402 |

FOREIGN PATENTS OR APPLICATIONS
| | | | |
|---|---|---|---|
| 1,162,395 | 4/1958 | France | 33/227 |

Primary Examiner—Richard E. Aegerter
Assistant Examiner—Richard R. Stearns
Attorney, Agent, or Firm—Wenderoth, Lind & Ponack

[57] ABSTRACT

An optical marker for use in determining the position of a target point which is in alignment with a given or required point, which generally comprises a projector assembly supported by a substantially threelegged support by means of a gimbaled mechanism for movement in all directions. The projector assembly emits a pair of light beams from both ends thereof which are in alignment with respect to each other: one light beam being adapted to be centered with the given or required point and the other light beam carrying an image of a patterned chart to be projected on an object above the given or required point.

4 Claims, 13 Drawing Figures

FIG. 1 PRIOR ART    FIG. 2
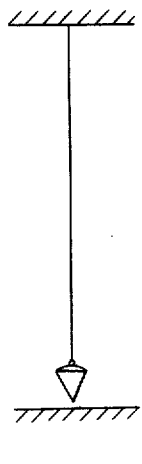
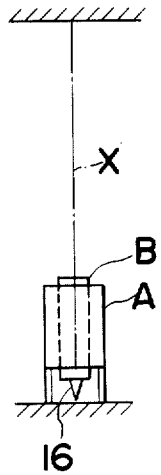
FIG. 4
FIG. 3
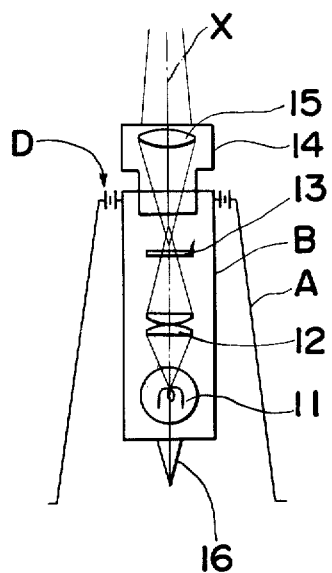
FIG. 6
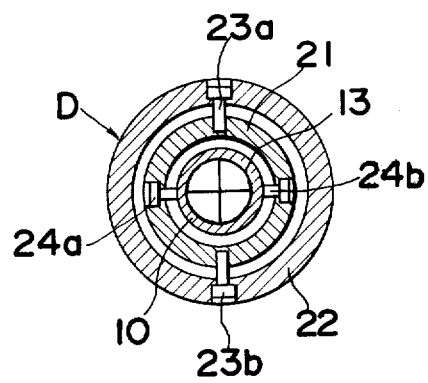

OPTICAL MARKER

The present invention relates to optical means substitutable for a plumb line having at one end a plumb bob or other weight and used to determine verticality. The optical means hereinabove recited is, for the sake of clarification and/or convenience, referred to as an "optical marker (or optomarker)" and this optical marker or optomarker herein disclosed is, unlike the plumb line, useable in determining not only verticality, but also horizontality.

In constructing architectural structures, the plumb line has been heretofore generally employed to determine the verticality of structural elements such as columns, corner struts, pillars and so on. This plumb line comprises a length of cord or thread having one end connected with a plumb bob or other conical weight and the other end adapted to be secured to the beam element or the ceiling of an architectural structure, such as shown in FIG. 1 of the accompanying drawings. Disadvantages and/or inconveniences of this plumb line are obvious since it has been long utilized. In other words, most disadvantages and/or inconveniences result from the fact that, with the plumb line, precise and ready determination of verticality cannot be achieved. By way of example, a gust of wind causes the plumb bob to swing and adjustment of verticality of the cord of the plumb line is, therefore, difficult. Moreover, placement of the plumb line in operative position is difficult and a carpenter is forced to climb up to the ceiling to secure the end of the cord opposite to the plumb bob, which is a troublesome and time-consuming job.

In the event, when the plumb line is used, centering of the plumb bob with respect to a given or required point on the ground or floor, smooth or rough, is, even if the verticality of the cord of the plumb line is successfully retained, difficult. The carpenter climbing up to the ceiling or similar structure and holding the end of the cord opposite to the plumb bob in an attempt to secure that end to the position immediately above said given or required point must necessarily adjust the position of that end of the cord to find the location vertically in alignment with said given or required point. This is obviously time-consuming work.

In determining whether or not two given points situated on the same horizontal plane or in order to find a point which lays on the same horizontal plane as a given point, for example, on an upstanding wall structure, leveling devices such as a transit instrument and level are utilized. However, even the transit instrument utilizes a plumb line and, therefore, the same disadvantages and/or inconveniences occur. On the other hand, the level, essentially comprising a glass tube filled with liquid medium in an amount smaller than the volume of the glass tube, thereby providing an air bubble in said liquid medium, has a limited number of application because of the size thereof.

Accordingly, an essential object of the present invention is to provide a novel optical marker for optically determining the point which lays in alignment with a given point, without requiring a carpenter, user or operator of the optical marker to be stationed adjacent to the point to be determined thereby.

Another important object of the present invention is to provide a novel optical marker of the type above referred to with which determination of the point laying in alignment with a given point (said first mentioned point being hereinafter referred to as "target point") can be easily and readily performed by a single person handling the optical marker.

A further object of the present invention is to provide a novel optical marker of the type above referred to which generally comprises a projector assembly designed to project a pair of beams of light in opposite directions and in alignment with each other, one beam of light adapted to be centered with a given point on a surface such as the ground or floor surface while the other beam is projected towards an object situated just above the given point, said projector assembly being operatively supported by a support by means of a gimbaled mechanism.

A still further object of the present invention is to provide a novel optical marker of the type above referred to wherein the optical marker further comprises a deflector unit detachably mounted on the projector assembly for deflecting a beam of light from a light source at right angles to the longitudinal axis of the projector assembly thereby to facilitate determination of common target points all laying on the same horizontal plane.

A still further object of the present invention is to provide a novel optical marker of the type above referred to, which is compact and easy to handle by a single attendant woker without requiring any skills and which can be manufactured at relatively low cost.

According to the present invention, the optical marker herein disclosed essentially comprises a substantially three-legged support, which concurrently serves as a housing structure, a projector assembly having the optical system substantially similar to that employed in any photographic slide projector and which includes a light source, a patterned chart and a focusing lens barrel, and a clamping unit. The projector assembly is so designed that a pair of light beams are projected from the light source in opposite directions, both in alignment with the optical axis, one being projected through the focusing lens barrel and the other being projected through a probe of cylindrical shape having a longitudinally extending pin-hole. This projector assembly is supported within and by the three-legged support through a gimbaled mechanism so as to be able to move in all directions.

The clamping unit acts not only to stationarily hold the projector assembly when not in use and/or during transportation of the optical marker from one place to another, but also to gradually reduce swinging motion of the projector assembly until it becomes stationary.

It should be noted that, in the above construction, the center of gravity of the projector assembly should be situated on the optical axis of the optical system employed, or otherwise the linear relationship of these two beams of light from the light source with respect to each other will be lost.

In the case where the verticality of an imaginary line connecting one point on the ground or floor, either smooth or rough, and another point on the ceiling of an architectural structure is to be determined, what is necessary is to align the beam of light emitted through the probe with the point on the ground or floor and to let an image of the patterned chart be projected on the ceiling. It is clear that, by observing whether or not the center of the projected image of the chart is aligned with the point on the ceiling, the verticality can be easily determined.

Similarly, in the case where it is sought to determine the position of a target point on the ceiling located vertically above the given point on the ground or floor, either smooth or rough, the substantially same procedure as hereinbefore described is required and it will be clear that the target point will be situated at the center of the projected image of the chart.

The deflector unit may be utilized in the case where a horizontal line is to be drawn on the upstanding wall structure.

These and other objects and features of the present invention will become apparent from the following description taken in conjunction with preferred embodiments with reference to the accompanying drawings, in which;

FIG. 1 is a schematic diagram showing a plumb line heretofore largely employed,

FIG. 2 is a schematic diagram showing a manner to determine verticality with the optical marker according to the present invention, FIG. 3 is a schematic side sectional view of the optical marker, showing the principle thereof, FIG. 4 is a top plan view of a patterned chart employed in the optical marker, FIG. 5 is a longitudinal side sectional view of the optical marker according to the present invention.

Figure 7:
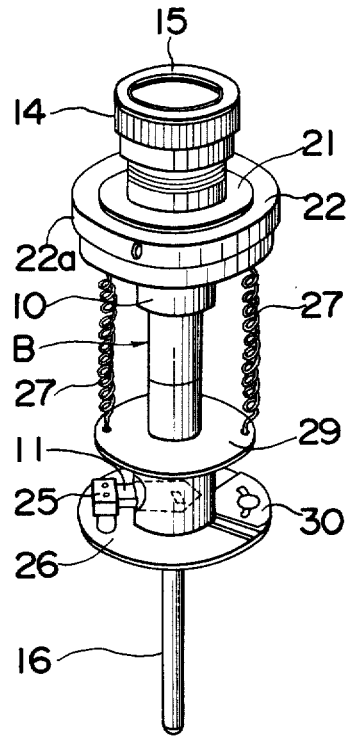
Figure 8:
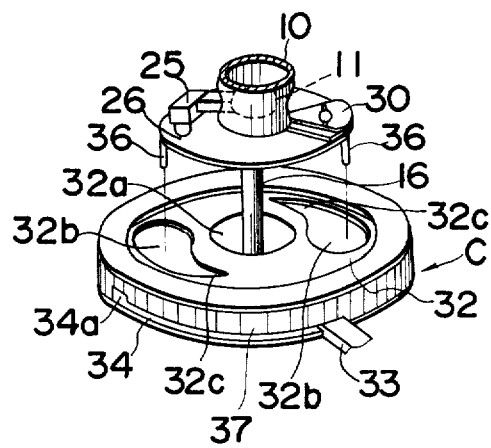
Figure 9:
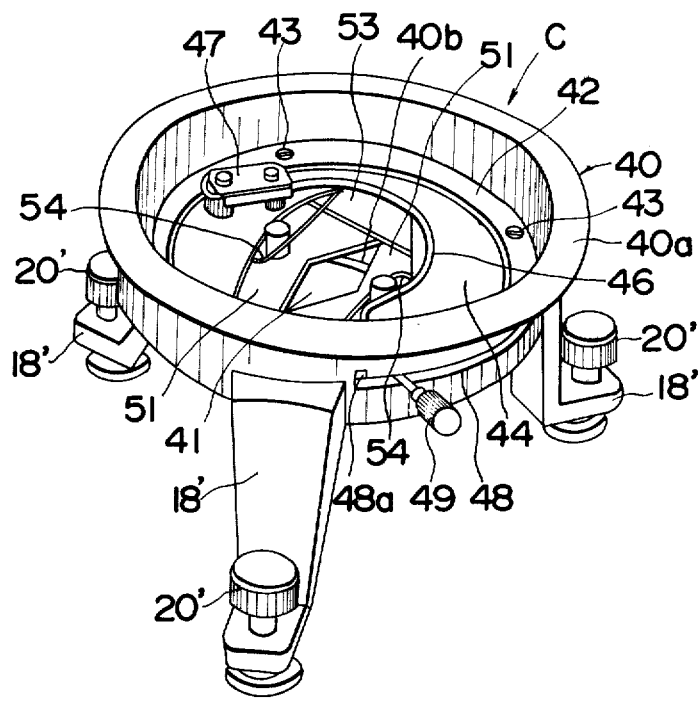
Figure 10:
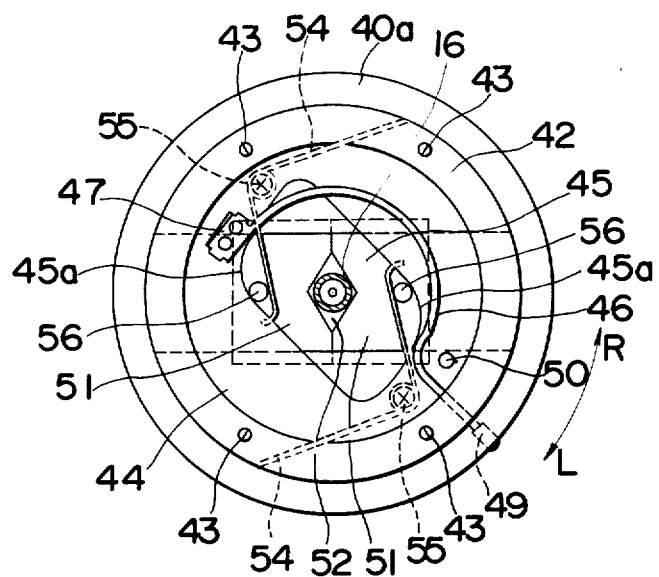
Figure 11:
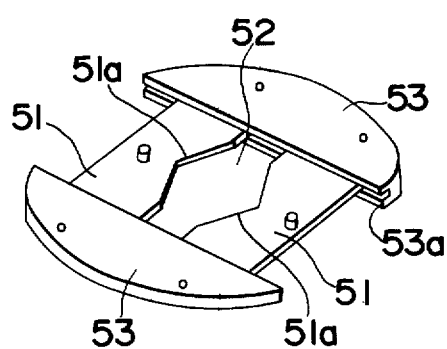
Figure 12:
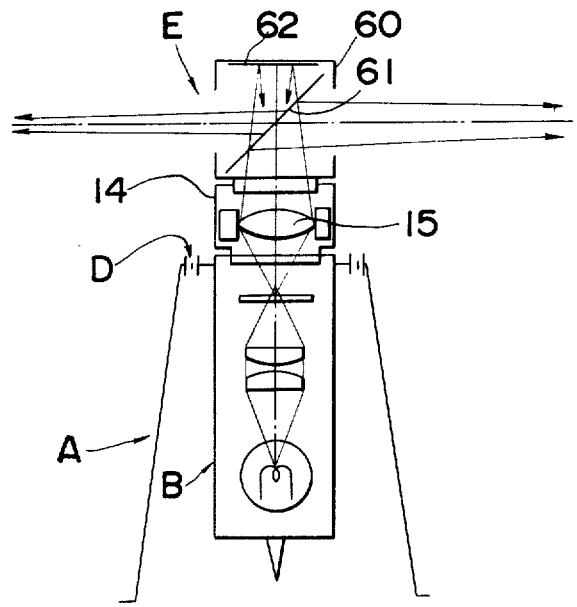
Figure 13:
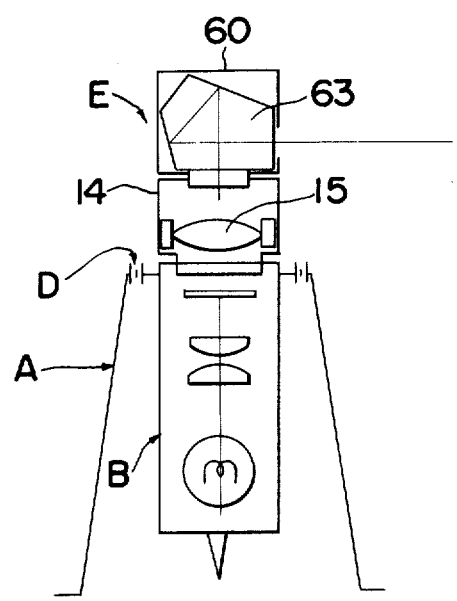

FIG. 6 is a cross-sectional view taken along the line VI—VI in FIG. 5, showing a gimbaled mechanism, FIG. 7 is a perspective view of a projector assembly and its associated parts employed in the optical marker of FIG. 5, FIG. 8 is a perspective view of a clamping unit, FIG. 9 is a perspective view of a modified clamping unit, FIG. 10 is a top plan view of the modified clamping unit of FIG. 9, FIG. 11 is a schematic perspective view of a pair of shutter plates employed in the modified clamping unit of FIG. 9, FIG. 12 is a similar diagram to FIG. 3, showing the optical marker mounted with a two-directional deflector unit, and FIG. 13 is a similar diagram to FIG. 3, showing the optical marker mounted with a one-directional deflector unit.

Referring now to FIGS. 2 to 8, an optical marker according to the present invention comprises a substantially three-legged support A, a projector assembly B and a clamping unit C. The projector assembly B includes a stationary barrel, generally indicated by 10 and accommodating therein a light source 11 preferably in the form of a halide filled lamp, a condensing lens group 12 and a patterned chart 13, all stationarily arranged in the order given above from the bottom, and an adjustable barrel 14 accommodating therein a projecting lens group 15 and axially movably mounted on an upper end portion of said stationary barrel 10 for focusing operation. The optical arrangement so far described of the projector assembly B is similar to that employed in any type of commercially available and known photographic slide projector and, therefore, the details thereof are herein omitted for the sake of brevity.

However, it is to be noted that the stationary barrel 10 has a lower end rigidly connected with a probe 16 having a through hole (not shown) extending in alignment with the longitudinal axis of said stationary barrel 10 and also in alignment with the optical axis X (FIG. 3) of the optical arrangement housed within said stationary barrel 10.

So far as the projector assembly 10 is constructed as hereinbefore described, when the light source 11 is switched on, a pair of light beams emerge respectively from the projecting lens group 15 in the adjustable barrel 14 after having passed through the patterned chart 13 and the probe 16, said pair of said light beams being oriented in the opposite directions with respect to each other and in alignment with each other. It is to be noted that the light beam emerging from the projecting lens group 15 in the adjustable barrel 14 through the patterned chart 13 carries an image of the pattern on the chart 13. Preferably, the pattern on the chart 13 is of a cruciform shape as shown in FIG. 4 and this chart 13 can be made of a photographic film, either negative or positive, or any other material such as a thin metallic disc. If the cruciform shape is employed for the pattern on the chart 13, the intersecting point between the two crossed lines should be situated on the optical axis of the optical arrangement of the projector assembly in alignment with the longitudinal axis of the barrel 10.

The projector assembly B of the above construction is supported by the support A by means of the gimbaled mechanism for movement in all directions, as will be hereinafter fully described.

Referring particularly to FIGS. 5 to 7, the support A comprises a cylindrical hollow body 17 having a lower end rigidly or integrally formed with at least three legs, generally indicated by 18 and only two of which are shown in FIG. 5, and an upper end provided with a lid 19 hingedly supported by said body 17 for selectively closing and opening the open end of said body 17. As clearly shown in FIG. 5, the cylindrical hollow body 17 is formed on its interior surface with a projection 17a which extends in the radially inward direction within said body 17. Each of the legs 18 has a free end carrying an adjustment screw 20 threadably extending therethrough for fine adjustment as will be mentioned later.

The gimbaled mechanism, generally indicated by D in FIGS. 5 to 7, comprises a pair of inner and outer ring members 21 and 22, both pivotally connected with each other by means of a pair of pin members 23a and 23b which extend in alignment with each other and at right angles to the longitudinal axis of the stationary barrel 10 and are 180° spaced from each other about said longitudinal axis of said stationary barrel 10. The inner ring member 21 is in turn connected pivotally with the stationary barrel 10 by means of a pair of pin members 24a and 24b which extend and are spaced in a similar manner as the pin members 23a and 23b, but are displaced at right angles from the adjacent member of the pin members 23a and 23b.

The outer ring member 22 is integrally formed with a radially outwardly extending collar 22a which, when the projector assembly B carrying the gimbaled mechanism D is inserted through the upper open end of the hollow body 17 into said body 17, rests on the radially inward projection 17a. This outer ring member 22 carried by the projector assembly B through the inner ring member 21 may be secured in position by means of a plurality of set screws (not shown) extending into the outer ring member 22 through a wall portion defining the hollow body 17.

This gimbaled mechanism D is similar to that employed in a magnetic compass for use at sea and, therefore, the details thereof are herein omitted for the sake of brevity. However, it is preferred that the gimbaled mechanism be arranged at a relatively high position, i.e., adjacent to the adjustable barrel 14 so that the center of gravity of the projector assembly B will be located at a relatively low position. In other words, the greater the distance between the gimbaled mechanism and the center of gravity of the projector assembly B, the sooner the projector assembly B ceases its swinging motion.

The light source 11 is supported by a socket 25 which is in turn rigidly mounted on an annular plate member 26 held in position between the barrel 10 and the probe 16. An electrical power from a suitable power source is fed to the light source 11 through the socket 25 by means of a pair of lead wires, generally indicated by 27. A portion of each of the lead wires 27 is coiled and supported by a pair of annular members 28 and 29, one (28) being secured to the outer ring member 22 and the other (29) being rigidly mounted on the barrel 10 adjacent to the light source 11, for avoiding a possible arbitrary movement of the lead wires 27. However, in practice, without utilizing the annular members 28 and 29, the lead wires 27 may be secured, for example, by the use of adhesive material, to the inner or outer surface of the stationary barrel 10 while connection between the power source and that end of each of the lead wires 27 is made by means the combined use of electrically conductive sliders and plate members respectively provided in the inner and outer ring members 21 and 22.

The annular plate member 26 is, in addition to the socket 25, provided with an adjustable balancer 30. This balancer 30 is provided for adjusting the optical axis X to pass through the center of gravity of the projector assembly B which may otherwise be displaced from the optical axis X and the longitudinal axis of said barrel 10 by the effect of the weight of the light source 11 and the socket 25. Positioning of this balancer 30 for the above mentioned adjustment is required only when the arrangement shown in FIG. 7 has been completely assembled and, once this adjustment has been done, no further adjustment of this balancer 30 is required.

The clamping unit C is housed within the hollow body 17 and below annular member 26 and comprises a fitting plate 31 having a central bore 31a and secured in position to the inner surface of the hollow body 17, and an annular shaped casing 37 suspended from the fitting plate 31 by means of a plurality of set screws (not shown) and rotatably accommodating therein a disc 32. As clearly shown in FIG. 8, the disc 32 is formed with a central bore 32a through which the probe 16 loosely extends, and also with a pair of cloud-shaped openings 32b on both sides of said central bore 32a, said cloud-shaped openings 32b being in symmetrical relation with respect to each other about the axis of rotation of said disc 32. This disc 32 is also rigidly provided with a handle 33 radially outwardly extending therefrom towards the outside of the hollow body 17 through a transverse slot 34, formed in the casing 32, and then a transverse slot 35 formed in the hollow body 17 in alignment with said transverse slot 34. It is to be noted that this handle 33 tends by its own resiliency to engage in a detent recess 34a formed at one end of the slot 34 in the casing 32. The detent recess which has been described as formed in the slot 34 may be formed at one end of the slot 35 in the hollow body 17.

The clamping unit C further includes a pair of pillars 36 rigidly carried by the annular plate member 26 and downwardly extending therefrom into the corresponding cloud-shaped openings 32b.

In the above arrangement, when the handle 33 is angularly moved to establish the condition as shown in FIG. 8, the probe 16 is permitted to move in all directions within the central bore 32a of the disc 32 without the pillars 36 contacting peripheral edges of these cloudshaped openings 32b, respectively. On the other hand, if the handle 33 is moved in the opposite direction until it is trapped in the detent recess 34a, each of the pillars 36 is trapped by a tapering tail portion 32c of the corresponding one of the cloud-shaped openings 32b and, therefore, the probe 16 and hence the stationary barrel 10 can be held stationary.

Thus, it has become clear that the clamping unit C acts not only to stationarily hold the projector assembly B when not in use and/or during transportation of the optical marker from one place to another, but also to gradually reduce swinging motion of the projector assembly thereby to facilitate easy and ready alignment of the light beam emerging from the probe 16 with a given point on the ground or floor.

Shown in FIGS. 9 to 11 is a modification of the clamping unit C of the foregoing embodiment. The modified clamping unit C of FIG. 9 to FIG. 11 is shown as having three legs 18' provided with respective adjustment screws 20' and, therefore, for fitting this modified clamping unit C to the support A accommodating therein the projector assembly B, the hollow body 17 shown in FIG. 5 should be employed in the form wherein a lower end portion of the cylindrical hollow body 17 below the level of the fitting plate 31 is omitted.

With the above in mind, the modified clamping unit C comprises a casing 40 having one end integrally formed with a radially outwardly extending flange 40a adapted to fit to the fitting plate 31 (FIG. 5) and the other, lower end integrally formed with a radially inwardly extending projection 40b providing an opening 41 adapted to permit the probe 16 to freely and loosely pass therethrough, and also having an annular plate member 42 secured within the casing 40 to the radially inward projection 40b in spaced relation with respect thereto by means of a plurality of set screws 43.

The modified clamping unit C further comprises a rotatable disc 44 formed about the center of rotation thereof with a slot 45 of substantially rhomboidal shape having a pair of curved camming edges 45a, both ends of said caming edges 45a respectively connected to the corresponding ends of the other caming edge to represent the substantially rhomboidal shape. This disc 44 is rotatably held in position within the casing with its circumferential edge supported in between the radially inward projection 40b and the annular plate member 42 above a shutter assembly which will be described later and which is supported in a similar fashion to the disc 44.

Mounted on the disc 44 is a handle 46 preferably made of a metallic material having a sufficient resiliency, for example, a piano wire. This handle 46 has one end portion secured to the disc 44 as at 47 and curved as shown in a semi-circular manner and the other end portion made straight and extending loosely through a transverse slot 48 circumferentially formed in the side wall constituting the casing 40. A knob 49 is rigidly provided at one end extremity of the handle 46 situated outside the casing 40. It is to be noted that the handle 46 is deformed such that the knob 49 situates above the plane of the end portion thereof that has been secured to the disc 44 whereby the end portion of the handle 46 adjacent to the knob 49 by its own resiliency, engages in a detent recess 48a formed at one end of the transverse slot 48.

The disc 44 is further provided with a stopper 50 engageable only when the knob 49, manually movable between locked and released positions, is to be moved in the direction as indicated by R in FIG. 10. The operation of this stopper 50 will become clear from the later description.

The modified clamping unit C further comprises a shutter assembly including a pair of shutter plates 51 each formed with a cut-out portion as at 51a, both cut-out portions 51a in the respective shutter plates 51 facing towards each other thereby to provide a common clamping hole 52 as clearly shown in FIG. 11. Both ends of each of these shutter plates 51 is slidably accommodated in respective grooves 53a formed in guide plates 53 as shown in FIG. 11 and the assembly of FIG. 11 is rigidly held in position on the radially inward projection 40b within the casing 40 and below the disc 44. For rigidly securing the assembly of FIG. 11, the set screws 43 may be commonly employed as can be understood from FIG. 10.

In the arrangement so far described, the size of the clamping hole 52 through which the probe 16 extends varies in response to linear movement of the shutter plates 51 in the opposite directions with respect to each other. In other words, as the shutter plates 51 are moved close to each other, the size of the clamping hole 52 is reduced and, finally, the probe 16 becomes clamped by the shutter plates 51 from both sides thereof.

For operating the shutter plates 51 in the manner as hereinabove described in response to movement of the knob 49 in both directions R and L between the released and locked positions, respectively, a pair of wire springs 54 are employed in association with the respective shutter plates 51 for converting rotation of the disc 44 into linear movement of the shutter plates 51 in the opposite directions. Each of these wire springs 54 is mounted at a substantially intermediate portion to a pin 55 secured to the radially inward projection 40b and has one end extremity restricted by a wall portion of the casing 40 and a portion adjacent to the other end extremity engaged with the corresponding shutter plate 51 by means of a corresponding one of pin members 56 rigidly carried respectively by the shutter plates 51. In this arrangement, the pin members 56 are biased by the corresponding wire springs 54 so as to separate the shutter plates 51 away from each other. However, this separation is restricted by the caming edges 45a contacting the respective pin members 56.

The condition shown in FIG. 10 illustrates that the probe 16 is firmly clamped, i.e., stationarily held, by the shutter plates 51, in which condition the knob 49 is in the locked position. During this condition, the handle portion adjacent the knob 49 is spaced a slight distance from the stopper 50 as shown, while the curved portion of the handle 46 remote from the knob 49 tends to radially inwardly deform against its own resiliency. However, the resiliency exerted by the handle 46 when said knob 49 is in the locked position is applied to the disc 44 through the connection 47 so as to further rotate said disc 44 in a direction parallel to the direction L of movement of the knob 49 with the caming edges 45a pushing the shutter plates 51 in a direction so close to each other that the probe 16 can be firmly clamped. In order to move the knob 49 to the released position, the knob 49 should be first downwardly pushed until the handle portion adjacent thereto escapes from the detent recess 48a and, thereafter, moved towards the released position along the transverse slot 48.

Shortly after the knob 49 is moved towards the released position, the handle portion adjacent to the knob 49 contacts the stopper 50, thereby causing the disc 44 to rotate in response to the movement of said knob 49. As the disc 44 rotates about the center thereof in the direction indicated by R, the pair of pin members 56 respectively biased by the wire springs 54 towards the corresponding camming edges 54b move, guided along the respective camming edges 45a, thus permitting the shutter plates 51 to move in the opposite directions away from each other and thereby releasing the probe 16 that has been stationarily held.

When the probe 16 is to be clamped by the shutter plates 51, it is necessary to move the knob 49 in the direction L. If the knob 49 is moved in the direction L, the various parts constituting the modified clamping unit operate in the reverse manner. However, in view of the fact that the wire springs 54 act to move the pin members 56 in the direction away from each other, the movement of the shutter plates 51 in the direction toward to each other relatively slowly takes place. This is particularly advantageous in that, when the probe 16 and hence the projector assembly B in swinging motion is to be stationarily held with the light beam therefrom aligned with the given point on the ground or floor, fine adjustment can be readily performed.

While the optical marker according to the present invention is constructed as hereinbefore described, it seems that placement of the optical marker in position with the probe 16 oriented towards the given point on the ground or floor would be difficult. Provided that the light beam emerging from the probe 16 is displaced a slight distance from alignment with the given point, exact alignment can be easily performed only by adjusting one or more of the adjustment screws 20 or 20'. This is possible because the projector assembly B itself is always vertically downwardly oriented by gravity.

From the foregoing description, it has now become clear that the target point sought to be detected can be determined by projecting an image of the patterned chart 13 on the ceiling or similar structural surface.

FIGS. 12 and 13 illustrate two different types of a deflector unit detachably mounted on the adjustable barrel 14 for deflecting the beam of light, emerging from the projecting lens group 15, at right angles with respect to the optical axis of the optical arrangement. This deflector unit, generally indicated by E is particularly advantageous in that, regardless of whether the ground or floor on which the optical marker is placed is rough or smooth, a horizontal line can be drawn. This is achieved by rotating the deflector unit E about the optical axis or the longitudinal axis of the projector assembly B in which case the light beams emerging from the projecting lens group 15 scans the upstanding wall structure or the like.

Referring now to FIG. 12, the deflector unit E comprises a casing 60 detachably mountable on the adjustable barrel 14 in any known manner, a semi-transparent mirror 61 housed within said casing 60 at an angle of 45° to the optical axis of the optical arrangement within the projector assembly B, and a reflective mirror 62 housed within said casing 60 at right angles to the optical axis of said optical arrangement within said projector assembly.

In this arrangement, the light beam emerging from the projecting lens group 15 is in part reflected by the semi-transparent mirror 61 towards the right and in part passes therethrough on to the reflective mirror 62. The portion of the light beam reflected by the reflective mirror 62 travel towards the semi-transparent mirror 61 and is then reflected thereby towards the left. Traces of portions of the light beam is clearly illustrated in FIG. 12.

On the other hand, the deflector unit E of FIG. 13 employs a pentagonal prism 63 instead of the use of the semi-transparent and reflective mirrors 61 and 62 that have been described as employed in the deflector unit of FIG. 12. This pentagonal prism 63 must have first and second reflective surfaces cooperating with respect to each other so as to deflect the beam of light from the projecting lens group 15 at right angles, as clearly illustrated in FIG. 13.

Although the present invention has been fully disclosed by way of example, it is to be noted that various changes and modifications are apparent to those skilled in the art. For example, it is not necessary to project the spot light at the side of the probe 16, and it is possible to design in such a manner that the end of the probe may coincide with a suitable given point if the probe end is made sharp and may be extended to the ground. Therefore, unless otherwise they depart from the true scope of the present invention, they should be construed as included therein.

What is claimed:

1. An optical marker for use in determining the position of a target point which is in alignment with a given or required point, which comprises:

a support structure;
   a projector assembly including a cylindrical body accommodating therein a light source and a projecting lens unit and a probe downwardly extending from said cylindrical body and having a through hole in alignment with the longitudinal axis of said cylindrical body, said light source being disposed between said projecting lens unit and said through hole, and said light source and the optical axis of said projecting lens unit also being in alignment with the longitudinal axis of said cylindrical body, said light source, when switched on, emitting a pair of first and second beams of light respectively passing through said projecting lens unit and said through hole, said first and second light beams emerging from said projector assembly in a linearly aligned relation with respect to each other in opposite directions;
   a gimbaled mechanism interposed between said projector assembly and said support structure for mounting said projector assembly on said support structure, said projector assembly thereby permitted to move with 2° of freedom; and
   a clamping structure carried by said support structure and adapted to clamp said projector assembly, said clamping structure including a pair of shutter members carried thereby for sliding movement towards and away from one another and forming a central opening therebetween through which said probe loosely downwardly extends and a manually operable member operable between first and second positions, said manually operable member being operatively connected to means for moving said shutter members away from one another to release said probe when said manual operable member moves to said first position and for moving said shutter members toward one another to clamp said probe when said manual operable member moves to said second position.

2. An optical marker as claimed in claim 1, wherein said means for moving further includes a first spring means for biasing said shutter membes in the opposite, radially outward direction away from each other and thus for biasing said manually operable member towards said first position.

3. An optical marker as claimed in claim 2, wherein said pair of shutter members have pin members respectively fixed thereon and wherein said means for moving further includes a rotatable disc formed with a central bore defining a pair of opposed cam surfaces, said pin members being in constant engagement with said respective cam surfaces by the biasing force of said first spring means, said shutter members, when said rotatable disc is rotated in one direction in response to the movement of said manually operable member from said first position to said second position, moving close to each other against said biasing force of said first spring member in response to said rotation of said rotatable disc while said pin members are respectively in sliding engagement with said cam surfaces.

4. An optical marker as claimed in claim 3, wherein said means for moving further includes a third pin member fixed on said rotatable disc and wherein said manually operable member comprises a wire spring member having one end portion fixed to said rotatable disc and the other end portion adapted to receive an external pushing force required to move said manually operable member, a substantially intermediate portion thereof being positioned adjacent said third pin member when said manually operable member is in said second position, said substantially intermediate portion, when said manually operable member is moved towards said first position, contacting said second pin member, thereby rotating said rotatable disc in a direction in which said shutter members are permitted to move away from each other to release said projector assembly and, when said manually operable member is moved in the opposite direction towards said second position, said disc rotating in a direction in which said shutter members move toward each other against the biasing force of said first spring means with said first pin members pressed by said cam surfaces to stationarily hold said projector assembly in position.

* * * * *